Jan. 28, 1958 P. B. SEBRING 2,821,694
DOPPLER CONTROLLED GAIN FOR ECHO RANGING EQUIPMENT
Filed Oct. 29, 1945
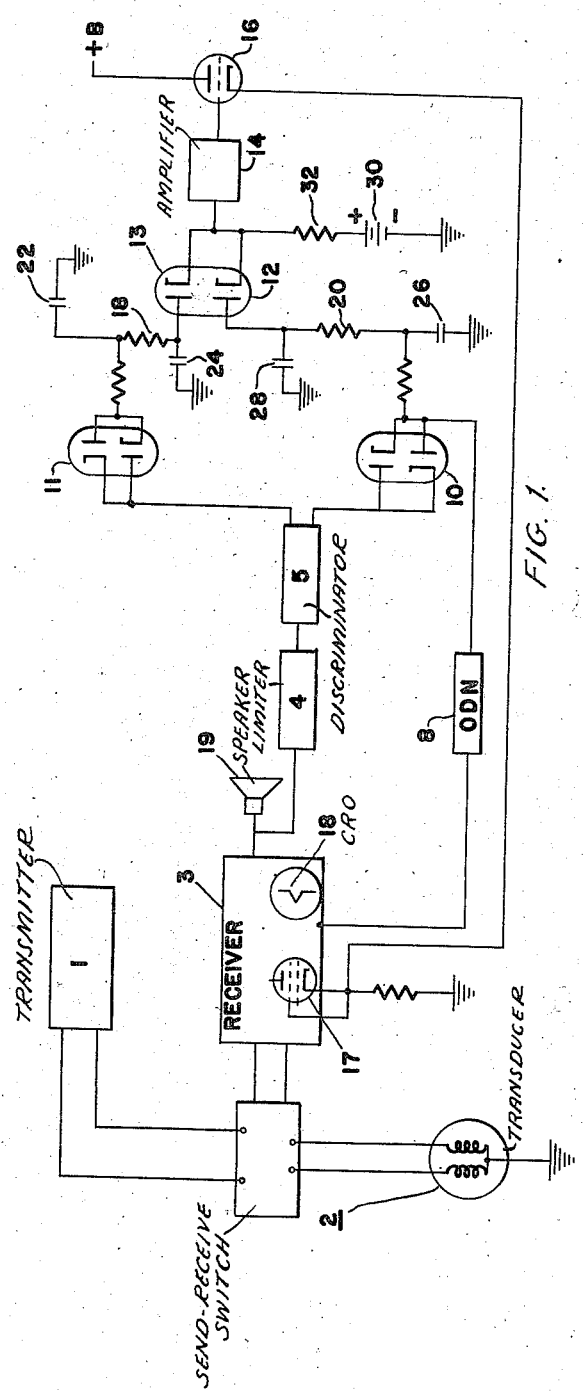
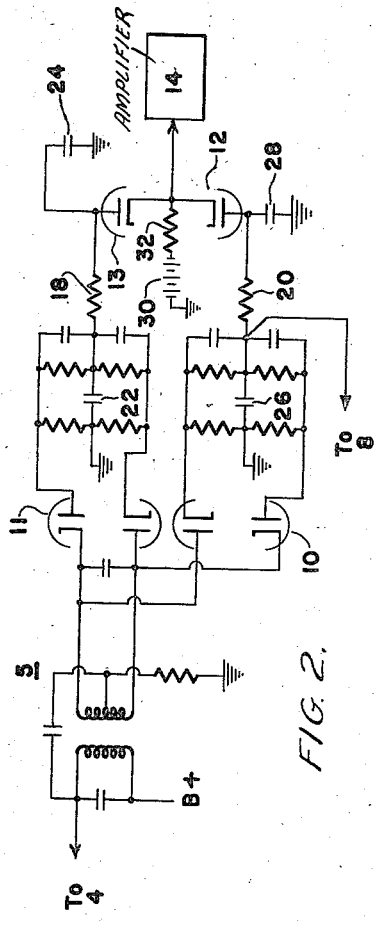
INVENTOR
PAUL B. SEBRING
BY
ATTORNEYS

United States Patent Office 2,821,694
Patented Jan. 28, 1958

2,821,694

DOPPLER CONTROLLED GAIN FOR ECHO RANGING EQUIPMENT

Paul B. Sebring, Cambridge, Mass., assignor to the United States of America as represented by the Secretary of the Navy Application October 29, 1945, Serial No. 625,425

6 Claims. (Cl. 340—3)

This invention relates to a method of controlling the gain of an underwater sound echo ranging receiver.

In the operation of echo ranging apparatus it is found that one of the most distinctive characteristics of an echo is the Doppler shift caused by the component of motion of the target through the water toward and away from the searching ship. Full advantage of this shift in frequency as a recognition aid is taken by the operator in listening to the echo as put out by the loud speaker with which his gear is equipped, no attempt has been made to utilize this echo property directly to enhance a visual indication, such as a trace on a cathode ray oscilloscope, or a trace on a recorder.

The primary object of the present invention is to provide a method of visual presentation of an echo received by an echo ranging equipment by utilizing the Doppler shift of an echo from a moving target.

Another object of the invention is to provide a method of visual presentation of an echo received by an echo ranging equipment by increasing the deflection and/or brightening of the trace of a cathode ray oscilloscope whenever an echo is received which differs in frequency to a predetermined degree from the frequency of normal reverberation.

Still another object of the invention is to provide an apparatus which may be used with a standard range recorder in such a manner that only echoes having a Doppler shift will appear.

Other objects and advantages of the invention will become apparent as the description proceeds, reference being had to the accompanying drawings in which:

Fig. 1 is a block diagram of one circuit which may be used to practice the invention; and Fig. 2 is a schematic diagram of a discriminator circuit usable in the present invention.

Referring to the drawing, Fig. 1, the invention is shown applied to an echo ranging equipment which includes a transmitter 1, a transducer 2 and a receiver 3 interconnected in the usual manner to emit short pulses of energy and to receive any echoes thereof which may return. The receiver is equipped with a device 8 designated ODN (own Doppler nullifier) to eliminate the Doppler shift in returned signals due to the motion of the searching vessel, such equipment being preferably of the type shown in the application of Leon G. S. Wood, Serial No. 547,919, filed August 3, 1944, now Patent No. 2,431,854, issued December 2, 1947. The receiver 3 output therefore is maintained at a substantially constant audio frequency and any substantial departure therefrom may be ascribed to so-called target Doppler.

There is illustrated in the drawing at 3 a conventional receiver of the type usually known as a Sonar receiver of the BDI (bearing deviation indicator) type wherein a loud-speaker 19 is provided for audio indications of received echo signals. Trained operators can audibly detect Doppler effects thereby. A cathode ray tube is normally supplied for visual observation of the echo signals, which is especially useful at short durations of signal when the auditory signals are difficult to interpret. The cathode ray tube proves particularly advantageous when the modification of the present invention is employed for pulses of short duration.

The receiver 3 includes one or more stages of amplification of a type wherein the gain is controlled by means of a direct current voltage, such as is conventionally found in ordinary radio sets employing remote cut-off pentode tubes in an automatic volume control circuit. The gain of these stages is controlled by the conduction of control tube 16 as hereinafter explained.

A portion of the output of receiver 3 is impressed on the limiter 4 which removes any amplitude variations therefrom, in conventional fashion. The limited signal is impressed on the discriminator 5 which produces a positive voltage proportional to the Doppler frequency shift of the signal on one or the other of two output circuits.

Referring now to Fig. 2, there is shown a pair of discriminator circuits employing a common discriminator transformer, the discriminator circuits being oppositely poled. While conventional discriminator circuits, such as the well known Seeley-Foster and Armstrong circuits may be used, the type of circuit illustrated in United States Patent No. 2,431,854 to Wood referenced above has been found especially suitable for the low frequencies normally encountered. It will be apparent that the outputs of the two discriminator circuits vary in opposite senses with variations in the frequency of the signal impressed thereon, one of which is always positive.

The output voltage of each of the discriminator circuits is filtered by means of a RC low-pass filter to remove minor fluctuations therein caused by random noise, reverberation. These filters comprise resistors 18 and 20, and capacitors 22, 24, 26 and 28. The filter adjustment and characteristics are such that an echo must persist for a time equivalent to about fifteen yards travel before the system operates to supply voltage to tube 16.

Diode sets 10 and 11 are connected to respective gate diodes 12 and 13 which are arranged to pass only the positive parts of the output, clipping the negative portions and leaving a V shaped output vs. frequency curve with the apex of the V at the normal center frequency of operation (indicated as 800 C. P. S.) and giving a positive voltage for a frequency deviation above or below such frequency.

The positive voltage output of diodes 12 and 13 is amplified and inverted as to phase in amplifier 14 and applied to the grid of a control tube 16 decreasing the current in tube 16 as the output of diodes 12 and 13 increases. Control tube 16 is preferably connected with its cathode connected to ground through the cathode resistor of an intermediate frequency amplifier tube to control the cathode bias of one of the intermediate frequency amplifying stages in the echo ranging receiver which gives the visual indications, although for certain applications it may be desirable to connect the control tube 16 to the grid of the amplifier stages whose gain is to be controlled.

To prevent operation of the control tube by reverberation which contains random components shifted in frequency from normal, a bias is imposed on the cathodes of diodes 12 and 13 which must be overcome before the output of diodes 10 and 11 can affect the control tube and hence the receiver 3 gain. Introduction of this bias from battery 30 through resistor 32 sets up a minimum target Doppler which must be present before any enhancement of the receiver indication takes place.

*Theory of operation*

According to the present invention the gain of the receiver is normally somewhat reduced by operation of the control tube 16 which acts to raise the potential of the cathode of the tube 17 in the receiver amplifier so long as tube 16 conducts normally.

When a pulse is transmitted the first signals received are, of course, those constituting close reverberation which are of random frequency and amplitude. These pass through the receiver and are rectified in diodes 12 and 13.

The reverberation centers closely around the frequency of transmission and if the vessel on which the equipment were mounted, were stationary, or the "own Doppler" shift otherwise removed or compensated for, the spread of frequency in the reverberation would not exceed about 12 cycles in either direction from the emitted frequency. Obviously it is undesirable for reverberation to have any effect on the control tube 16, so diodes 12 and 13 are biased so that a received signal must be shifted in frequency by, for example, 20 cycles before the output from diodes 10 and 11 can pass to control tube 16. At 20 kc. operating frequency the Doppler shift amounts to about 14 cycles for each knot of target speed so that even a slowly moving target is sufficient to cause a noticeable enhancement, either by increased deflection or brightening, of the indication on the CRO (cathode ray oscilloscope) 18 as the outputs of diodes 10 and 11 pass, through the amplifier and phase inverter, a negative potential to tube 16 increasing as the Doppler shift increases.

The imposition of the negative potential on the grid of control tube 16 reduces the flow of current through the tube and hence reduces the biasing action which the control tube has been exerting on the receiver. As the biasing is removed from the receiver the gain thereof increases and the signal indication in the receiver, both visual on the CRO 18 and aural in the speaker 19, is increased.

As soon as the Doppler shifted signal has passed, control tube 16 again conducts normally, biasing the receiver tube 17 and reducing the receiver gain. Receiver gain, however, is never reduced to the point where an echo B from a stationary target would pass unrecognized.

What is claimed is:

1. Apparatus for controlling the gain of an echo ranging receiver having an electronic variable gain amplifier including a discriminator having substantially zero output at a predetermined center frequency of operation and having a positive output for signals of other frequencies, means to amplify the output of said discriminator and to produce a negative D. C. potential which increases in magnitude as the frequency of signal input to said discriminator departs from said center frequency, a control tube normally biasing said electronic variable gain amplifier to reduce the gain thereof, and means to apply said negative D. C. potential to said control tube.

2. In an echo ranging receiver, a source of echo signals having a mean frequency and a Doppler frequency shift, an amplifier having its input connected to said source of echo signals and having a gain increasable by the application thereto of a positive voltage, an echo indicator connected to the output of said amplifier, means responsive to said Doppler frequency shift to produce a negative voltage proportional to deviation in frequency of said echo signals from said mean frequency, a control tube connected to receive the negative voltage and to produce therefrom a positive voltage, and means for impressing the positive voltage on said amplifier, whereby echo signals from moving targets are accentuated over echo signals from stationary targets.

3. In an echo ranging receiver; a source of echo signals having a frequency shifted from a mean frequency in proportion to the relative speed of the target reflecting said echo signals, an amplifier having its input connected to said source of echo signals and having a variable gain increased by a positive voltage, an echo indicator connected to the output of said amplifier, detector means responsive to deviations in frequency of said echo signals from said mean frequency to produce a proportional thereto, a control tube connected to said detector means to receive the negative voltage and produce therefrom a positive voltage, and means for impressing the positive voltage on said amplifier, whereby echo signals from moving targets are accentuated.

4. In a receiver for use with echo ranging equipment, a source of echo signals shifted in frequency from a mean frequency by an amount indicative of the speed of a target, an amplifier having an input, an output, and a control terminal, said amplifier having a gain increasable by the application of a unidirectional control voltage to said control terminal, an echo indicator connected to the output of said amplifier, a frequency discriminator circuit connected to the output of said amplifier to produce a direct current voltage proportional to the frequency deviation of said echo signals from said mean frequency, a control tube connected to said frequency discriminator for producing a unidirectional control voltage and means impressing said unidirectional control voltage on the control terminal of said amplifier, whereby to accentuate moving targets.

5. In a receiver for use with echo ranging equipment, a source of echo signals shifted in frequency from a mean frequency by an amount indicative of the speed of a target, an amplifier having an input, an output and a control terminal, said amplifier having a gain increasable by the application of a unidirectional control voltage to said control terminal, an echo indicator connected to the output of said amplifier, limiter means connected to the output of said amplifier, frequency discrimination means connected to said limiter to produce a unidirectional voltage proportional to the frequency deviation of said echo signals from said mean frequency, a control tube connected to said frequency discrimination means for producing a unidirectional control voltage, and means impressing said unidirectional control voltage on the control terminal of said amplifier, whereby to accentuate the indication of moving targets.

6. In a receiver for echo ranging equipment, a source of echo signals shifted in frequency from a mean frequency by an amount proportional to the relative speed of the target, an amplifier having an input, an output and a control terminal, said amplifier having a gain increasable by the application of a unidirectional control voltage to said control terminal, means connecting the input of said amplifier to said source of echo signals, an echo indicator connected to the output of said amplifier, limiter means connected to the output of said amplifier to produce a signal voltage having a predetermined magnitude, first discriminator means connected to said limiter means for producing a direct current voltage of a predetermined polarity when said signal voltage is of a frequency exceeding said mean frequency, second frequency discriminator means connected to said limiter means for producing a direct current voltage of said predetermined polarity when said signal voltage is of a frequency less than said mean frequency, rectifier means passing voltage of said predetermined polarity connected to said first and second frequency discriminator means respectively, a control tube connected to said rectifier means for producing a unilateral control voltage proportional to the frequency deviation of an echo signal, and means for impressing said unidirectional control voltage on the control terminal of said amplifier, whereby to accentuate the indication of moving targets.

References Cited in the file of this patent

UNITED STATES PATENTS

| | | |
|---|---|---|
| 1,667,540 | Dorsey | Apr. 24, 1928 |
| 2,066,156 | Muffly | Dec. 29, 1936 |
| 2,405,281 | Bemis | Aug. 6, 1946 |
| 2,431,854 | Wood | Dec. 2, 1947 |
| 2,566,858 | Sebring | Sept. 4, 1951 |

FOREIGN PATENTS

| | | |
|---|---|---|
| 542,634 | Great Britain | Jan. 21, 1952 |